(12) United States Patent
McNeill et al.

(10) Patent No.: US 12,348,475 B2
(45) Date of Patent: Jul. 1, 2025

(54) SMART EVENTS FRAMEWORK

(71) Applicant: Salesforce, Inc., San Francisco, CA (US)

(72) Inventors: Mitchell McNeill, Dallas, TX (US); Monica Carrillo Wilkinson, San Rafael, CA (US); Neil Brady, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 23 days.

(21) Appl. No.: 18/052,351

(22) Filed: Nov. 3, 2022

(65) Prior Publication Data

US 2024/0154927 A1    May 9, 2024

(51) Int. Cl.
| | |
|---|---|
| *G06F 15/16* | (2006.01) |
| *H04L 51/214* | (2022.01) |
| *H04L 51/216* | (2022.01) |
| *H04L 51/23* | (2022.01) |

(52) U.S. Cl.
CPC .......... *H04L 51/216* (2022.05); *H04L 51/214* (2022.05); *H04L 51/23* (2022.05)

(58) Field of Classification Search
CPC ...... H04L 51/216; H04L 51/23; H04L 51/214
USPC ........................................................ 709/206
See application file for complete search history.

(56) References Cited

U.S. PATENT DOCUMENTS

| | | | | |
|---|---|---|---|---|
| 6,557,027 B1 * | 4/2003 | Cragun | .................. | H04L 51/04 |
| | | | | 719/329 |
| 7,644,144 B1 * | 1/2010 | Horvitz | .................. | G06Q 10/10 |
| | | | | 709/204 |
| 9,940,394 B1 * | 4/2018 | Grant | .................... | G06F 16/951 |
| 9,948,739 B2 * | 4/2018 | Spivey | .................. | H04L 67/567 |
| 10,110,523 B2 * | 10/2018 | Badge | .................. | H04L 51/046 |
| 10,116,599 B2 * | 10/2018 | Wu | .................. | G06F 3/0483 |
| 10,268,340 B2 * | 4/2019 | Chen | .................... | G06Q 10/107 |
| 10,402,371 B2 * | 9/2019 | Johnston | ................ | G06Q 10/10 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Alicia Baturay
(74) *Attorney, Agent, or Firm* — Lee & Hayes, P.C.

(57) ABSTRACT

Techniques for a framework associated with a group-based communication platform for enabling applications to scale events to be distributable to various users over a communication platform are described. For example, a group-based communication platform may receive a message from a first application to send to a second application. The group-based communication platform may identify a topic and an event associated with the message. The group-based communication platform may then send the message to a queue associated with the second application, wherein the queue is associated with the topic and a user of the second application. The group-based communication platform may then cause presentation of the message to the user. In some examples messages may be sent bidirectionally, such that a message may be sent from the second application to the first application.

20 Claims, 9 Drawing Sheets

(56) References Cited

U.S. PATENT DOCUMENTS

| | | | | |
|---|---|---|---|---|
| 10,541,825 | B2* | 1/2020 | Jin | G06F 16/27 |
| 10,757,050 | B2* | 8/2020 | Badge | H04L 51/046 |
| 10,775,990 | B1* | 9/2020 | Jamison | G06F 16/955 |
| 10,880,111 | B2* | 12/2020 | Jin | H04L 67/1097 |
| 10,908,801 | B2* | 2/2021 | Fay | G06F 3/0482 |
| 10,983,683 | B2* | 4/2021 | Fay | G06N 20/00 |
| 11,099,726 | B1* | 8/2021 | Montazeri | H04L 12/1827 |
| 11,139,993 | B2* | 10/2021 | Bourassa-Denis | H04L 51/52 |
| 11,223,493 | B2* | 1/2022 | Jin | G06F 16/27 |
| 11,252,537 | B2* | 2/2022 | DeLanghe | H04L 67/12 |
| 11,341,093 | B2* | 5/2022 | Johnston | H04L 67/1097 |
| 11,373,636 | B2* | 6/2022 | Banko | G06F 40/169 |
| 11,481,735 | B1* | 10/2022 | Schemers | G06Q 10/1093 |
| 11,522,729 | B2* | 12/2022 | Jin | H04L 67/1097 |
| 11,551,001 | B2* | 1/2023 | Banko | G06F 40/279 |
| 11,567,649 | B2* | 1/2023 | Jamison | H04L 51/48 |
| 11,575,772 | B2* | 2/2023 | Brito | H04L 67/568 |
| 11,586,584 | B2* | 2/2023 | Johnston | G06F 16/13 |
| 2018/0287982 | A1 | 10/2018 | Draeger et al. | |
| 2019/0220541 | A1* | 7/2019 | Meling | H04L 51/04 |
| 2022/0301551 | A1* | 9/2022 | Banko | G06F 40/30 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

SMART EVENTS FRAMEWORK

TECHNICAL FIELD

Source system integration allows businesses and organizations to consolidate data from different sub-systems or sub-components into a single, larger system architecture. This allows data to be easily shared between partner organizations, enabling effective and accessible data distribution. However, in order for data to be effectively transmitted from one application to another, the data must be unified in similar data formats. Moreover, this data is sent bi-directionally, only allowing for one-to-one type connections. Thus, current system integration techniques are limited in scope and functionality.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 2B illustrates a user interface for multimedia collaboration sessions within the group-based communication system for certain examples.

FIG. 3A depicts a user interface for workflows within a group-based communication system;

DETAILED DESCRIPTION

Figure 1:
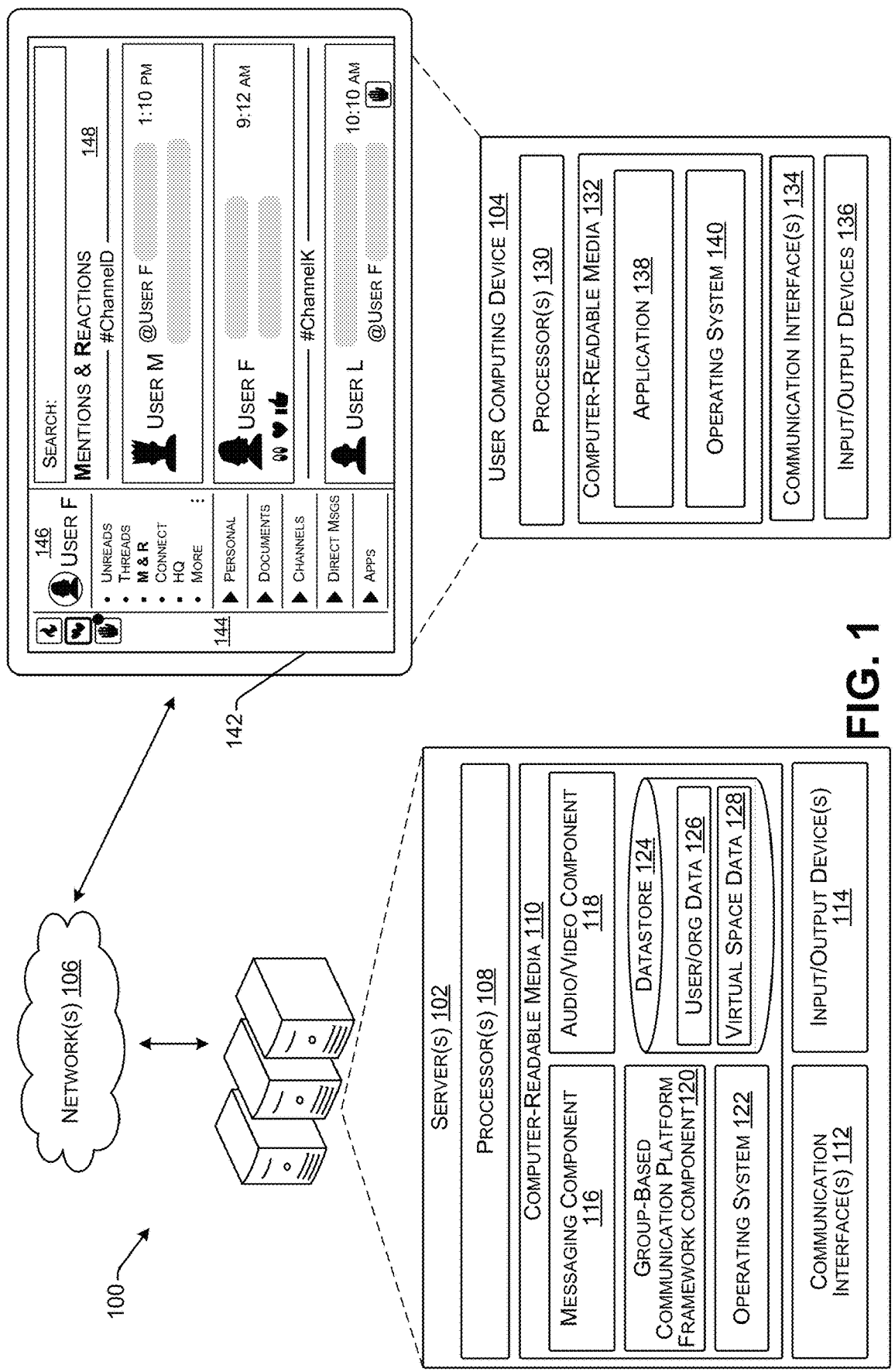
FIG. 1 illustrates an example system for performing techniques described herein.

A communication platform can leverage a network-based computing system to enable users and applications to exchange data with one or more other users and/or applications via communication channels (or "channels"). A channel, or other virtual space, can be a data route used for exchanging data between and among systems and devices associated with the communication platform. For example, a channel may be established between and among various user computing devices, allowing the user computing devices to communicate and share data between and among each other over one or more networks. That is, in some examples, the communication platform can be a group-based communication platform, a channel-based communication platform, a permission-based communication platform, a channel-based messaging platform, and/or any other platform and/or hub for facilitating communication between and among users. In some examples, data associated with a channel can be presented via a user interface. In some examples, the user interface can present a data feed indicating messages posted to and/or actions taken with respect to a particular channel.

In some examples, the group-based communication platform associated with a network-based computing system may facilitate the exchange of data among and between data from multiple applications. For instance, the communication platform may allow for integration of applications, such as third-party applications associated with other companies and organizations and/or applications associated with the communication platform. Rather than switching between various platforms and applications, users may seamlessly access applications, such as via channels associated with the communication platform.

Existing techniques, such as point-to-point integration, also known as one-to-one integration, fosters data development and sharing by tightly coupled integration of multiple applications. For example, in a point-to-point integration between a single sender and a single receiver, the sender may place a message in a specified queue associated with the receiver. Once in the queue, the message may be forwarded to the appropriate receiver. After receiving the message, the receiver may process the message.

However, such techniques are not without limitations. While current techniques are adequate for simple one-to-one integration, they are insufficient for scaling larger integrations. This is due in part to a n(n−1) connections rule (also referred to as the n-squared problem). For example, suppose that a group-based communication platform received five messages from a sender which are to be sent to a receiver. Due to the bi-directional nature of sending and receiving messages, each message sent to the receiver may be sent from the receiver back to the sender. Thus, a total of 25 connections may be possible. In the instance of large-scale communication platforms, such as companies dealing with a large number of transactions, this integration model may become quickly unmanageable.

Thus, the techniques described herein describe a framework associated with a group-based communication platform for enabling applications to scale events to be distributed to various users over a communication platform. The framework, (also to referred herein as a "distribution layer"), may bridge source systems, such as third-party applications and/or applications associated with the group-based communication platform, such that data may be sent bi-directionally to and from the applications in a similar format, allowing applications to scale data transmission from one-to-one transmissions to one-to-many transmissions. Moreover, in some examples, the techniques described herein may incorporate a content-oriented router and/or a message subscription, enabling multiple receivers to process a single message. For example, a message may be sent from a third-party application (herein referred to as a "source application") to an application associated with the group-based communication platform. Additionally, rather than converting the message to a specified message format, as required in existing techniques, the group-based communication platform may determine a message format in which messages are received at the framework. By defining a message format, source systems are responsible for ensuring their data may be compatible with the group-based communication system. Upon receiving the message, the group-based communication platform may confirm that the format of the message received at the framework is the same format as that desired.

In some examples, the group-based communication platform may then analyze the message to determine a user to send the message to. For example, based at least in part on determining the format of the message received at the group-based communication platform is the same or similar message format determined by the group-based communication platform, the group-based communication platform may determine a topic associated with the message and/or an event of a user associated with the message. A topic may include a subject associated with the message such as, "approvals," "expenses," "cases," "tasks," "slides," or "reports," to name a few non-limiting examples. Alternatively, an event may be a message that satisfies a condition and/or a parameter indicating an error, a lack of information available to an application, or a happening that may positively or negatively impact a business, for example. The group-based communication platform may then, based on determining a topic and/or an event of the message, contain sufficient information to determine a queue to send the message to. The queue may be associated with the topic and a second application. Similar to that of the first application, the second application may be a third-party application external from the group-based communication platform. However, the second application may be additionally or alternatively an internal application associated with the group-based communication platform, such as a group-based communication service. The group-based communication platform may then send the message to the queue, which may then cause the message to be presented to the user. In some examples, the message may comprise a request for an action to be taken by the user in association with the group-based communication platform. The user may perform the request, and based at least in part on the performance, the group-based communication platform may cause performance of the action.

In some examples, the user may wish to send a second message from the second application back to the first application. For example, the user may send a message indicating the action, as requested by the message from the first account. In a similar way as to sending the message from the first application to the second application described above, the group-based communication platform framework may facilitate the exchange of a message from the second application to the first application.

As an illustrative example, suppose a source application is a third-party application associated with an accounts payable software. For example, a company may utilize the source application to provide travel and expense management for their business, in which employees of the business may communicate over the group-based communication platform. Suppose, for example, the company received an indication of a travel expense from an employee of the company that needs to be approved through the source application, such as by a payroll employee. The accounts payable software may then send, to the group-based communication platform, a message associated with the travel expense. Upon receiving the message, the group-based communication platform may analyze the message to determine a topic and an event associated with the message. For example, the message may be titled "application-approvals-activity" with a "pending" status. Based at least in part on analyzing the title and/or the status of the message, the group-based communication platform may determine that the message may be associated with a pending expense charge, which requires action by a payroll employee. The group-based communication platform may then determine a queue associated with the payroll employee and the group-based communication platform (e.g., a channel), and may send the message to the queue of the payroll employee.

Because the group-based communication platform determined that an action is required from the payroll employee (e.g., approve the expense, deny the expense, etc.), the group-based communication platform may send, to the payroll employee, an indication of the message and the action required. For example, the payroll employee may receive, via the channel associated with the group-based communication platform, a bot notifying the payroll employee that they have a new approval pending, and one or more options associated with a response to the message (e.g., approve the expense, deny the expense, etc.). The response may then be sent back to the source system via the group-based communication platform, allowing the source system to properly update its data based on payroll employee's response.

The techniques described herein may reduce the hardware, software, and/or knowhow required for computing systems of different applications to accomplish data interchange. Moreover, the techniques discussed herein may have the added benefit of adding a layer between source systems and a group-based communication platform, allowing data transmission to be scaled from one-to-one transmissions to one-to-many transmissions. The techniques may also reduce an amount of data residing on cloud systems. Rather than storing messages on a cloud for later processing and authentication, messages may be received from source systems when needed. The techniques may therefore reduce the amount of hardware and/or software required to accomplish data transmissions, thereby increasing the available memory and/or computational cycles available and reducing power consumption. As such, systems structured in accordance with various examples of the disclosure provide specific, technical solutions to technical problems, the details of which are described herein.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and/or input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a group-based communication framework component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of user interface associated with one or more of the user(s) associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation, and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation, and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the group-based communication framework component 120 can facilitate the exchange of messages from a first application to a second application. For example, the group-based communication framework component 120 may receive a message from a first application at an API Endpoint of the group-based communication framework component 120. The API Endpoint may send the message to a lambda function of the group-based communication framework 120, which may verify that an activity type associated with the message is the same or similar as a pre-determined activity type of the group-based communication framework component 120. The group-based communication framework component 120 may also include one or more queues, which may be associated with users associated with the second application. For example, the group-based communication framework component 120 may contain a machine-learned model, which may analyze the message to determine a topic and/or an event associated with the message. The group-based communication framework component 120 may then facilitate the transportation of the message to a queue associated with the topic of the message. The group-based communication framework component 120 may then send, via the queue and to a user associated with the second application, the message.

In some examples, the group-based communication framework component 120 may further facilitate the exchange of messages from the second application to the first application through the group-based communication platform. This and other aspects are described below in detail, in FIGS. 4 and 5.

In some examples, the communication platform can manage communication channels. In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In some examples, a channel can be a virtual space where people can post messages, documents, and/or files. In some examples, access to channels can be controlled by permissions. In some examples, channels can be limited to a single organization, shared between different organizations, public, private, or special channels (e.g., hosted channels with guest accounts where guests can make posts but are prevented from performing certain actions, such as inviting other users to the channel). In some examples, some users can be invited to channels via email, channel invites, direct messages, text messages, and the like. Examples of channels and associated functionality are discussed throughout this disclosure.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j_doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

In some examples, such as when a channel is shared between two organizations, each organization can be associated with its own encryption key. When a user associated with one organization posts a message or file to the shared channel it can be encrypted in the datastore 124 with the encryption key specific to the organization and the other organization can decrypt the message or file prior to accessing the message or file. Further, in examples where organizations are in different geographical areas, data associated with a particular organization can be stored in a location corresponding to the organization and temporarily cached at a location closer to a client (e.g., associated with the other organization) when such messages or files are to be accessed. Data can be maintained, stored, and/or deleted in the datastore 124 in accordance with a data governance policy associated with each specific organization.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via WebSockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units, and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with. In some examples, the third region 148 may be resized or popped out as a standalone window.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via WebSockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

User Interface for a Group-Based Communication System

Figure 2A:
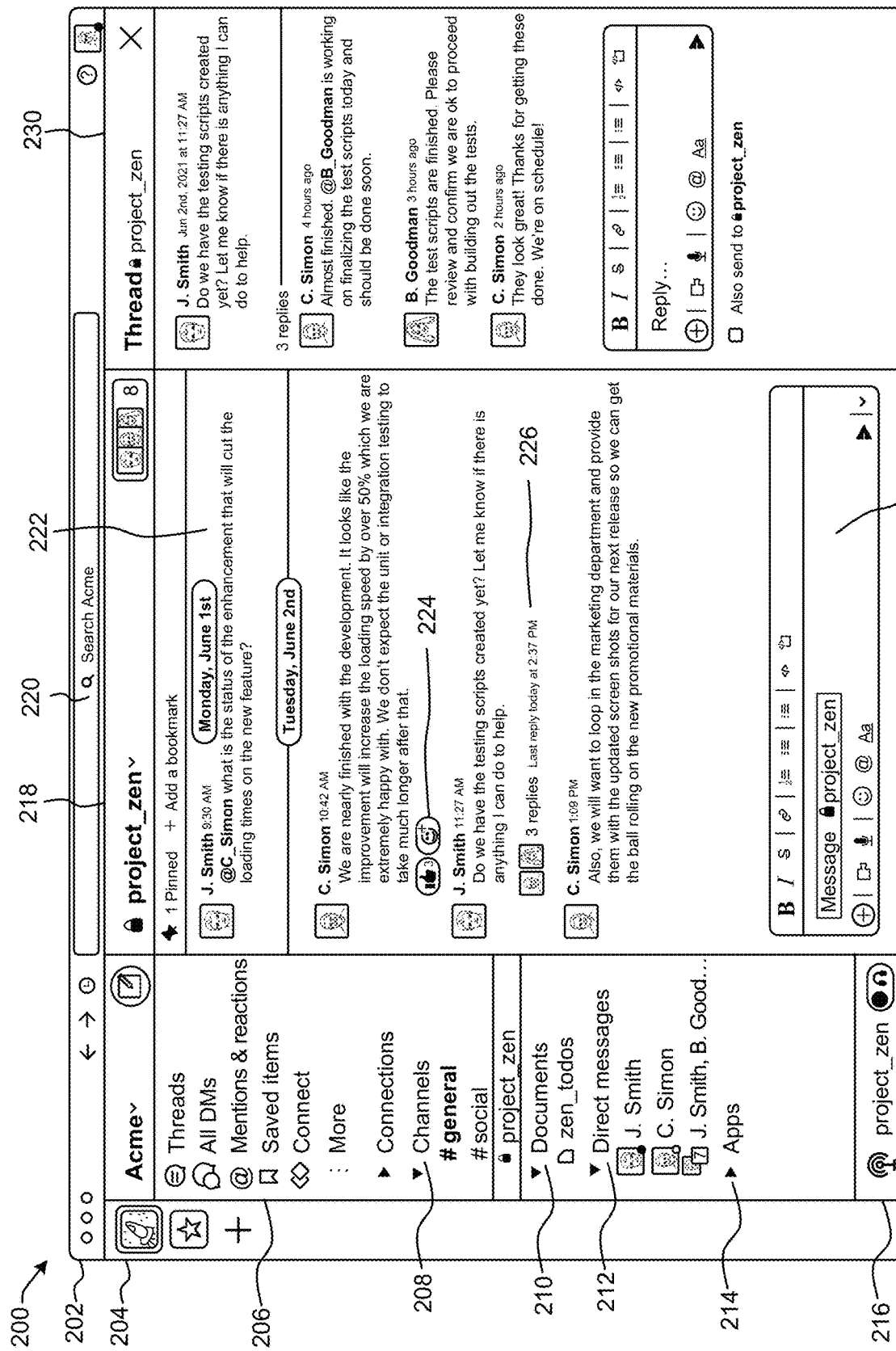
FIG. 2A illustrates a user interface for a group-based communication system for certain examples.

FIG. 2A illustrates a user interface 200 of a group-based communication system, which will be useful in illustrating the operation of various examples discussed herein. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

The user interface 200 comprises a plurality of objects such as panes, text entry fields, buttons, messages, or other user interface components that are viewable by a user of the group-based communication system. As depicted, the user interface 200 comprises a title bar 202, a workspace pane 204, a navigation pane 206, channels 208, documents 210 (e.g., collaborative documents), direct messages 212, applications 214, a synchronous multimedia collaboration session pane 216, and channel pane 218.

By way of example and without limitation, when a user opens the user interface 200 they can select a workspace via the workspace pane 204. A particular workspace may be associated with data specific to the workspace and accessible via permissions associated with the workspace. Different sections of the navigation pane 206 can present different data and/or options to a user. Different graphical indicators may be associated with virtual spaces (e.g., channels) to summarize an attribute of the channel (e.g., whether the channel is public, private, shared between organizations, locked, etc.).

When a user selects a channel, a channel pane 218 may be presented. In some examples, the channel pane 218 can include a header, pinned items (e.g., documents or other virtual spaces), an "about" document providing an overview of the channel, and the like. In some cases, members of a channel can search within the channel, access content associated with the channel, add other members, post content, and the like. In some examples, depending on the permissions associated with a channel, users who are not members of the channel may have limited ability to interact with (or even view or otherwise access) a channel. As users navigate within a channel they can view messages 222 and may react to messages (e.g., a reaction 224), reply in a thread, start threads, and the like. Further, a channel pane 218 can include a compose pane 228 to compose message(s) and/or other data to associate with a channel. In some examples, the user interface 200 can include a threads pane 230 that provides additional levels of detail of the messages 222. In some examples, different panes can be resized, panes can be popped out to independent windows, and/or independent windows can be merged to multiple panes of the user interface 200. In some examples, users may communicate with other users via a collaboration pane 216, which may provide synchronous or asynchronous voice and/or video capabilities for communication. Of course, these are illustrative examples and additional examples of the aforementioned features are provided throughout this disclosure.

In some examples, title bar 202 comprises search bar 220. The search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some examples, the title bar 202 comprises navigation commands allowing a user to move backwards and forwards between different panes, as well as to view a history of accessed content. In some examples, the title bar 202 may comprise additional resources such as links to help documents and user configuration settings.

In some examples, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some examples, the user interface 200 comprises the workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use the workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some examples, an organization, such as a particular company, may have a plurality of workspaces, and the user may be associated with one or more workspaces belonging to the organization. In yet other examples, a particular workspace can be associated with one or more organizations or other entities associated with the group-based communication system.

In some examples, the navigation pane 206 permits users to navigate between virtual spaces such as pages, channels 208, collaborative documents 210 (such as those discussed at FIG. 2D), applications 214, and direct messages 212 within the group-based communication system. For example, the navigation pane 206 can include indicators representing virtual spaces that can aggregate data associated with a plurality of virtual spaces of which the user is a member. In at least one example, each virtual space can be associated with an indicator in the navigation pane 206. In some examples, an indicator can be associated with an actuation mechanism (e.g., an affordance, also referred to as a graphical element) such that when actuated, can cause the user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally or in the alternative, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

The navigation pane 206 may further comprise indicators representing communication channels (e.g., the channels 208). In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the navigation pane 206 may depict some or all of the communication channels that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the navigation pane 206 can depict some or all of the communication channels that the user is a member of, and the user can interact with the user interface 200 to browse or view other communication channels that the user is not a member of but are not currently displayed in the navigation pane 206. In some examples, different types of communication channels (e.g., public, private, shared, cross-workspace, etc.) can be in different sections of the navigation pane 206, or can have their own sub-regions or sub-panes in the user interface 200. In some examples, communication channels associated with different workspaces can be in different sections of the navigation pane 206, or can have their own regions or panes in the user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, the navigation pane 206 can include indicators representative of communications with individual users or multiple specified users (e.g., instead of all, or a subset of, members of an organization). Such communications can be referred to as "direct messages." The navigation pane 206 can include indicators representative of virtual spaces that are associated with private messages between one or more users.

The direct messages 212 may be communications between a first user and a second user, or they may be multi-person direct messages between a first user and two or more second users. The navigation pane 206 may be sorted and organized into hierarchies or sections depending on the user's preferences. In some examples, all of the channels to which a user has been granted access may appear in the navigation pane 206. In other examples, the user may choose to hide certain channels or collapse sections containing certain channels. Items in the navigation pane 206 may indicate when a new message or update has been received or is currently unread, such as by bolding the text associated with a channel in which an unread message is located or adding an icon or badge (for example, with a count of unread messages) to the channel name. In some examples, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally or in the alternative, the navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels within the Group-Based Communication System

In some examples, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some examples, the channel pane 218 may display information related to a channel that a user has selected in the navigation pane 206. For example, a user may select the project_zen channel to discuss the ongoing software development efforts for Project Zen. In some examples, the channel pane 218 may include a header comprising information about the channel, such as the channel name, the list of users in the channel, and other channel controls. Users may be able to pin items to the header for later access and add bookmarks to the header. In some examples, links to collaborative documents may be included in the header. In further examples, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via the channel pane 218 of the user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

The channel pane 218 may include messages such as message 222, which is content posted by a user into the channel. Users may post text, images, videos, audio, or any other file as the message 222. In some examples, particular identifiers (in messages or otherwise) may be denoted by prefixing them with predetermined characters. For example, channels may be prefixed by the "#" character (as in #project_zen) and username may be prefixed by the "@" character (as in @J_Smith or @User_A). Messages such as the message 222 may include an indication of which user posted the message and the time at which the message was posted. In some examples, users may react to messages by selecting a reaction button 224. The reaction button 224 allows users to select an icon (sometimes called a reacji in this context), such as a thumbs up, to be associated with the message. Users may respond to messages, such as the message 222, of another user with a new message. In some examples, such conversations in channels may further be broken out into threads. Threads may be used to aggregate messages related to a particular conversation together to make the conversation easier to follow and reply to, without cluttering the main channel with the discussion. Under the message beginning the thread appears a thread reply preview 226. The thread reply preview 226 may show information related to the thread, such as, for example, the number of replies and the members who have replied. Thread replies may appear in a thread pane 230 that may be separate from the channel pane 218 and may be viewed by other members of the channel by selecting the thread reply preview 226 in the channel pane 218.

In some examples, one or both of the channel pane 218 and the thread pane 230 may include a compose pane 228. In some examples, the compose pane 228 allows users to compose and transmit messages 222 to the members of the channel or to those members of the channel who are following the thread (when the message is sent in a thread). The compose pane 228 may have text editing functions such as bold, strikethrough, and italicize, and/or may allow users to format their messages or attach files such as collaborative documents, images, videos, or any other files to share with other members of the channel. In some examples, the compose pane 228 may enable additional formatting options such as numbered or bulleted lists via either the user interface or an API. The compose pane 228 may also function as a workflow trigger to initiate workflows related to a channel or message. In further examples, links or documents sent via the compose pane 228 may include unfurl instructions related to how the content should be displayed.

Synchronous Multimedia Collaboration Sessions

Figure 2B:
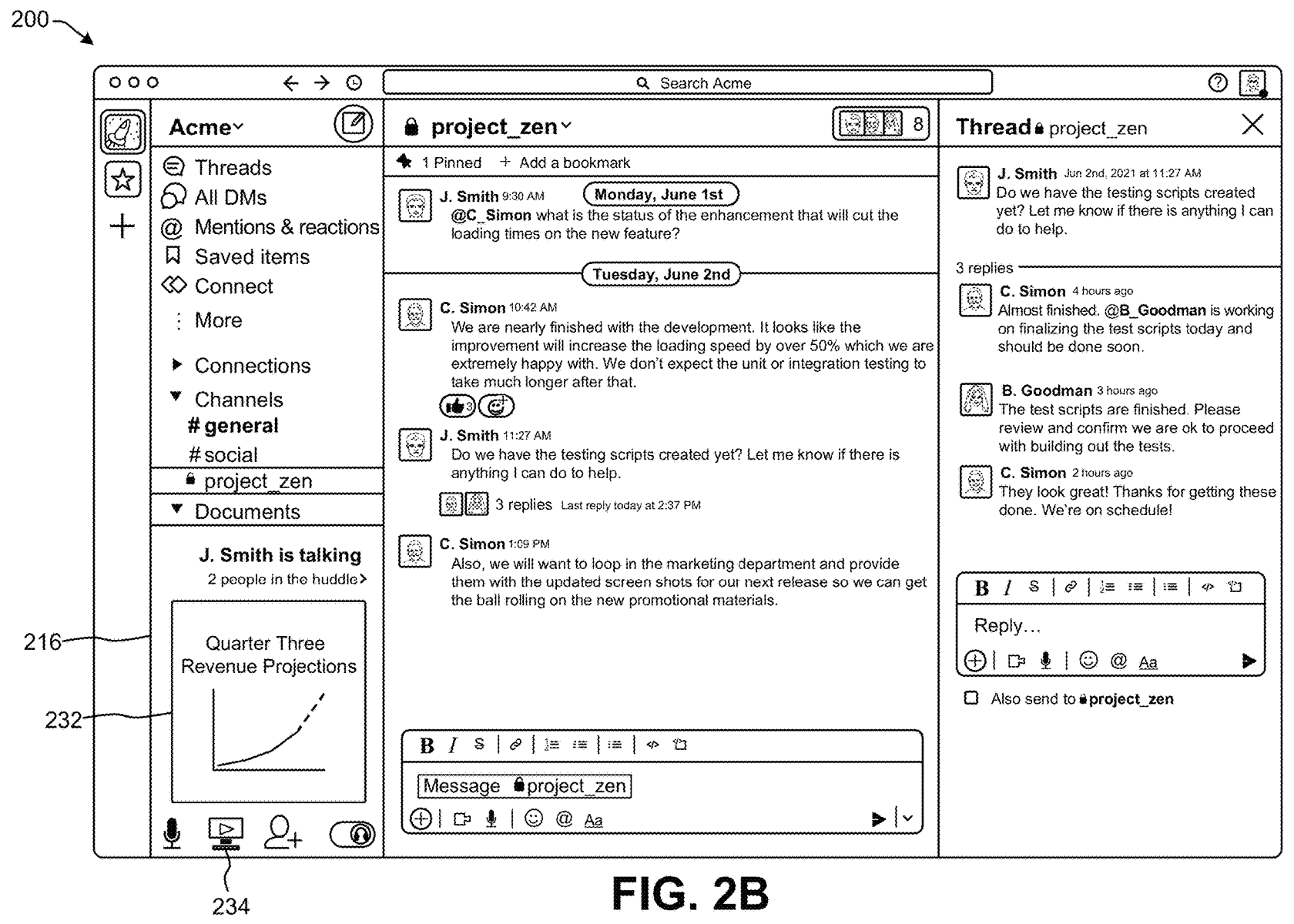

FIG. 2B illustrates a multimedia collaboration session (e.g., a synchronous multimedia collaboration session) that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some examples, synchronous multimedia collaboration sessions may be based around a particular topic, a particular channel, a particular direct message or multi-person direct message, or a set of users, while in other examples, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some examples, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without requiring scheduling or initiating a communication session through a third-party interface. In some examples, users may be directly invited to attend a synchronous multimedia collaboration session via a message or notification.

Synchronous multimedia collaboration sessions may be short, ephemeral sessions from which no data is persisted. Alternatively, in some examples, synchronous multimedia collaboration sessions may be recorded, transcribed, and/or summarized for later review. In other examples, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some examples, members of the synchronous multimedia collaboration session may mark-up, comment on, draw on, or otherwise annotate a shared screen. In further examples, such annotations may be saved and persisted after the synchronous multimedia collaboration session has ended. A canvas may be created directly from a synchronous multimedia collaboration session to further enhance the collaboration between users.

In some examples, a user may start a synchronous multimedia collaboration session via a toggle in synchronous multimedia collaboration session pane 216 shown in FIG.

2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 232. In some examples, users in the synchronous multimedia collaboration session may be displayed with an icon indicating that they are participating in the synchronous multimedia collaboration session. In further examples, an expanded view of the participants may show which users are active in the synchronous multimedia collaboration session and which are not. Screen share preview 232 may depict the desktop view of a user sharing the user's screen, or a particular application or presentation. Changes to the user's screen, such as the user advancing to the next slide in a presentation, will automatically be depicted in screen share preview 232. In some examples, the screen share preview 232 may be actuated to cause the screen share preview 232 to be enlarged such that it is displayed as its own pane within the group-based communication system. In some examples, the screen share preview 232 can be actuated to cause the screen share preview 232 to pop out into a new window or application separate and distinct from the group-based communication system. In some examples, the synchronous multimedia collaboration session pane 216 may comprise tools for the synchronous multimedia collaboration session allowing a user to mute the user's microphone or invite other users. In some examples, the synchronous multimedia collaboration session pane 216 may comprise a screen share button 234 that may permit a user to share the user's screen with other members of the synchronous multimedia collaboration session pane 216. In some examples, the screen share button 234 may provide a user with additional controls during a screen share. For example, a user sharing the user's screen may be provided with additional screen share controls to specify which screen to share, to annotate the shared screen, or to save the shared screen.

In some cases, the synchronous multimedia collaboration session pane 216 may persist in the navigation pane 206 regardless of the state of the group-based communication system. In some examples, when no synchronous multimedia collaboration session is active and/or depending on which item is selected from the navigation pane 206, the synchronous multimedia collaboration session pane 216 may be hidden or removed from being presented via the user interface 200. In some instances, when the pane 216 is active, the pane 216 can be associated with a currently selected channel, direct message, or multi-person direct message such that a synchronous multimedia collaboration session may be initiated and associated with the currently selected channel, direct message, or multi-person direct message.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some examples, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some examples, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some examples, machine-learning techniques such as cluster analysis can be used to determine recommended users. The list of recommended active users may include status user information for each recommended user, such as whether the recommended user is active, in a meeting, idle, in a synchronous multimedia collaboration session, or offline. In some examples, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some examples, one or more recommended asynchronous multimedia collaboration sessions or meetings can be displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some examples, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some examples, a preview of a subset of video replies may be shown in the asynchronous collaboration session or thread. This can allow, for example, a user to jump to a relevant segment of the asynchronous multimedia collaboration session or to pick up where they left off previously.

Connecting within the Group-Based Communication System

Figure 2C:
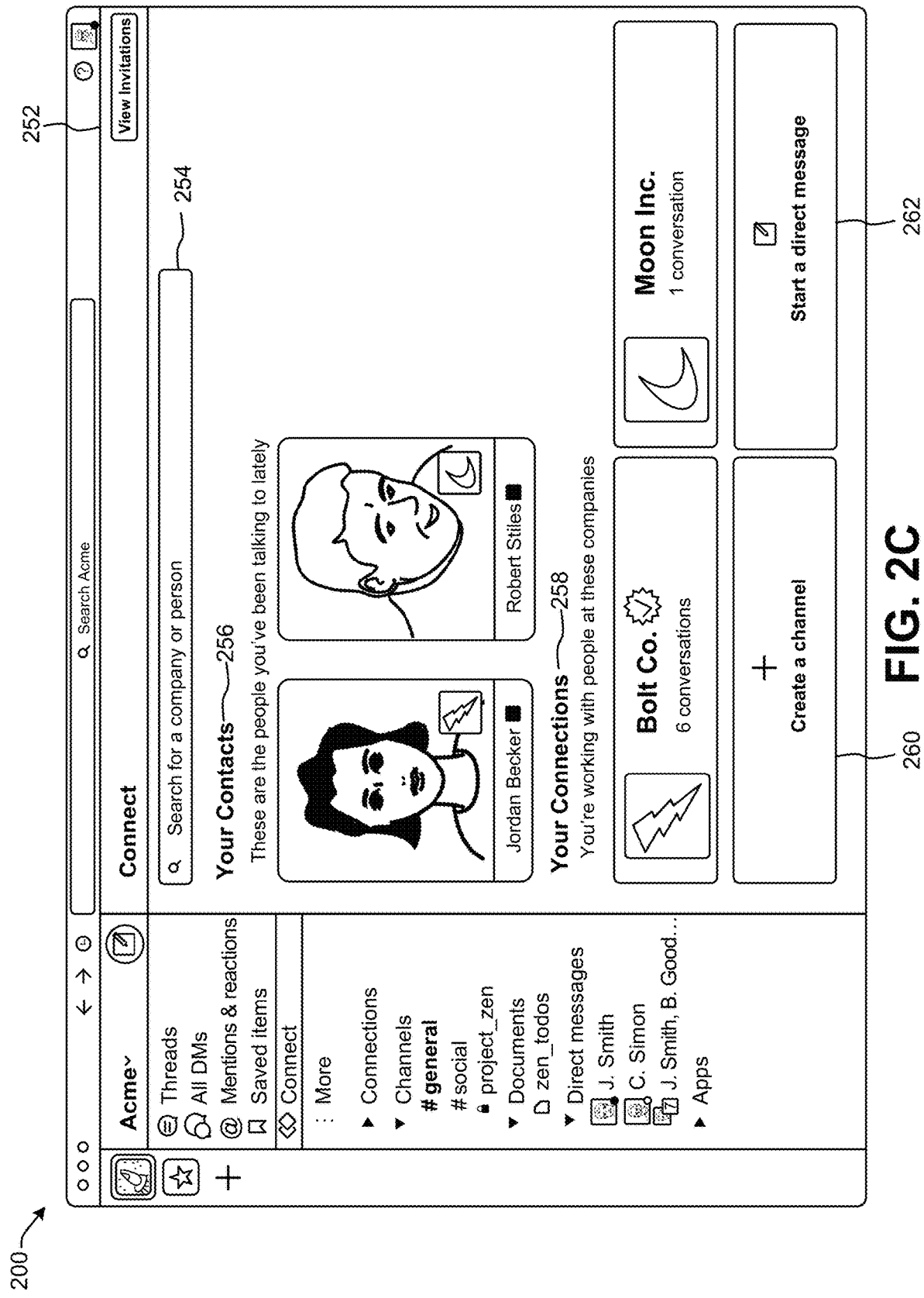
FIG. 2C illustrates a user interface for inter-organization collaboration within the group-based communication system for certain examples.

FIG. 2C illustrates user interface 200 displaying a connect pane 252. The connect pane 252 may provide tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. The connect pane 252 may enable users to determine which other users and organizations are already within the group-based communication system, and to invite those users and organizations currently outside of the group-based communication system to join.

The connect pane 252 may comprise a connect search bar 254, recent contacts 256, connections 258, a create channel button 260, and/or a start direct message button 262. In some examples, the connect search bar 254 may permit a user to search for users within the group-based communication system. In some examples, only users from organizations that have connected with the user's organization will be shown in the search results. In other examples, users from any organization that uses the group-based communication system can be displayed. In still other examples, users from organizations that do not yet use the group-based communication can also be displayed, allowing the searching user to invite them to join the group-based communication system. In some examples, users can be searched for via their group-based communication system username or their email address. In some examples, email addresses may be suggested or autocompleted based on external sources of data such as email directories or the searching user's contact list.

In some examples, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some examples, the recent contacts 256 may display users with whom the instant user has recently interacted. The recent contacts 256 may display the user's name, company, and/or a status indication. The recent contacts 256 may be ordered based on which contacts the instant user most frequently interacts with or based on the contacts with whom the instant user most recently interacted. In some examples each recent contact of the recent contacts 256 may be an actuatable control allowing the instant user to quickly start a direct message conversation with the recent contact, invite them to a channel, or take any other appropriate user action for that recent contact.

In some examples, the connections 258 may display a list of companies (e.g., organizations) with which the user has interacted. For each company, the name of the company may be displayed along with the company's logo and an indication of how many interactions the user has had with the company, for example the number of conversations. In some examples, each connection of the connections 258 may be an actuatable control allowing the instant user to quickly invite the external organization to a shared channel, display recent connections with that external organization, or take any other appropriate organization action for that connection.

In some examples, the create channel button 260 allows a user to create a new shared channel between two different organizations. Selecting the create channel button 260 may further allow a user to name the new connect channel and enter a description for the connect channel. In some examples, the user may select one or more external organizations or one or more external users to add to the shared channel. In other examples, the user may add external organizations or external users to the shared channel after the shared channel is created. In some examples, the user may elect whether to make the connect channel private (e.g., accessible only by invitation from a current member of the private channel).

In some examples, the start direct message button 262 allows a user to quickly start a direct message (or multi-person direct message) with external users at an external organization. In some examples, the external user identifier at an external organization may be supplied by the instant user as the external user's group-based communication system username or as the external user's email address. In some examples, an analysis of the email domain of the external user's email address may affect the message between the user and the external user. For example, the external user's identifier may indicate (for example, based on an email address domain) that the user's organization and the external user's organization are already connected. In some such examples, the email address may be converted to a group-based communication system username. Alternatively, the external user's identifier may indicate that the external user's organization belongs to the group-based communication system but is not connected to the instant user's organization. In some such examples, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
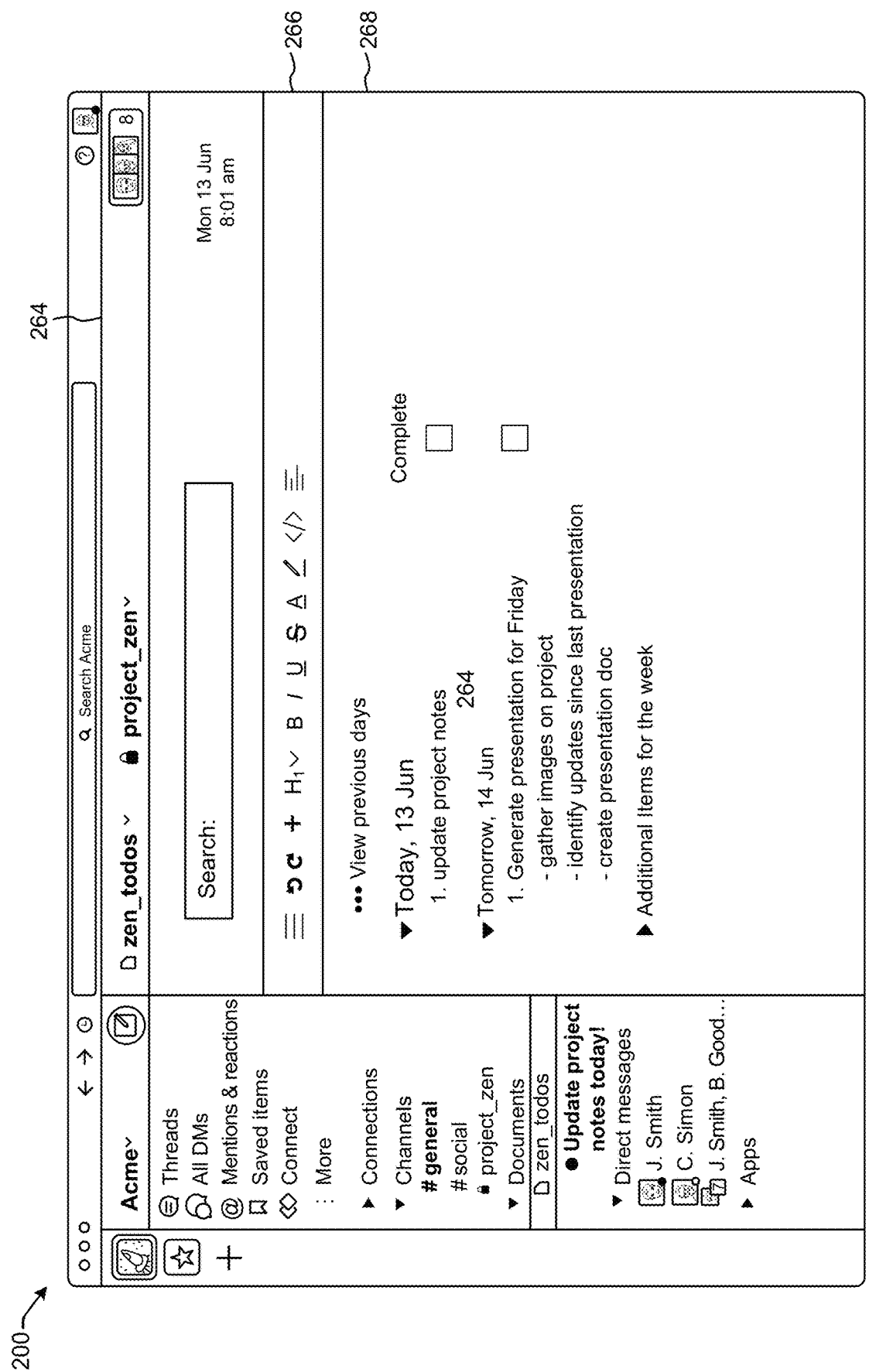
FIG. 2D illustrates a user interface for collaborative documents within the group-based communication system for certain examples.

FIG. 2D illustrates user interface 200 displaying a collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. In some examples, permissions can be determined and/or assigned automatically based on how document(s) are created and/or shared. In some examples, permission can be determined manually. Collaborative documents may allow users to simultaneously or asynchronously create and modify documents. Collaborative documents may integrate with the group-based communication system and can both initiate workflows and be used to store the results of workflows, which are discussed further below with respect to FIGS. 3A and 3B.

In some examples, the user interface 200 can comprise one or more collaborative documents (or one or more links to such collaborative documents). A collaborative document (also referred to as a document or canvas) can include a flexible workspace for curating, organizing, and sharing collections of information between users. Such documents may be associated with a synchronous multimedia collaboration session, an asynchronous multimedia collaboration session, a channel, a multi-person direct message conversation, and/or a direct message conversation. Shared canvases can be configured to be accessed and/or modified by two or more users with appropriate permissions. Alternatively or in addition, a user might have one or more private documents that are not associated with any other users.

Further, such documents can be @mentioned, such that particular documents can be referred to within channels (or other virtual spaces or documents) and/or other users can be @mentioned within such a document. For example, @mentioning a user within a document can provide an indication to that user and/or can provide access to the document to the user. In some examples, tasks can be assigned to a user via an @mention and such task(s) can be populated in the pane or sidebar associated with that user.

In some examples, a channel and a collaborative document 268 can be associated such that when a comment is posted in a channel it can be populated to a document 268, and vice versa.

In some examples, when a first user interacts with a collaborative document, the communication platform can identify a second user account associated with the collaborative document and present an affordance (e.g., a graphical element) in a sidebar (e.g., the navigation pane 206) indicative of the interaction. Further, the second user can select the affordance and/or a notification associated with or representing the interaction to access the collaborative document, to efficiently access the document and view the update thereto.

In some examples, as one or more users interact with a collaborative document, an indication (e.g., an icon or other user interface element) can be presented via user interfaces with the collaborative document to represent such interactions. For examples, if a first instance of the document is presently open on a first user computing device of a first user, and a second instance of the document is presently open on a second user computing device of a second user, one or more presence indicators can be presented on the respective user interfaces to illustrate various interactions with the document and by which user. In some examples, a presence indicator may have attributes (e.g., appearance attributes) that indicate information about a respective user, such as, but not limited to, a permission level (e.g., edit permissions, read-only access, etc.), virtual-space membership (e.g., whether the member belongs to a virtual space associated with the document), and the manner in which the user is interacting with the document (e.g., currently editing, viewing, open but not active, etc.).

In some examples, a preview of a collaborative document can be provided. In some examples, a preview can comprise a summary of the collaborative document and/or a dynamic preview that displays a variety of content (e.g., as changing text, images, etc.) to allow a user to quickly understand the context of a document. In some examples, a preview can be based on user profile data associated with the user viewing the preview (e.g., permissions associated with the user, content viewed, edited, created, etc. by the user), and the like.

In some examples, a collaborative document can be created independent of or in connection with a virtual space and/or a channel. A collaborative document can be posted in a channel and edited or interacted with as discussed herein, with various affordances or notifications indicating presence of users associated with documents and/or various interactions.

In some examples, a machine-learning model can be used to determine a summary of contents of a channel and can create a collaborative document comprising the summary for posting in the channel. In some examples, the communication platform may identify the users within the virtual space, actions associated with the users, and other contributions to the conversation to generate the summary document. As such, the communication platform can enable users to create a document (e.g., a collaborative document) for summarizing content and events that transpired within the virtual space.

In some examples, documents can be configured to enable sharing of content including (but not limited to) text, images, videos, GIFs, drawings (e.g., user-generated drawings via a drawing interface), or gaming content. In some examples, users accessing a canvas can add new content or delete (or modify) content previously added. In some examples, appropriate permissions may be required for a user to add content or to delete or modify content added by a different user. Thus, for example, some users may only be able to access some or all of a document in view-only mode, while other users may be able to access some or all of the document in an edit mode allowing those users to add or modify its contents. In some examples, a document can be shared via a message in a channel, multi-person direct message, or direct message, such that data associated with the document is accessible to and/or rendered interactable for members of the channel or recipients of the multi-person direct message or direct message.

In some examples, the collaboration document pane 264 may comprise collaborative document toolbar 266 and collaborative document 268. In some examples, collaborative document toolbar 266 may provide the ability to edit or format posts, as discussed herein.

In some examples, collaborative documents may comprise free-form unstructured sections and workflow-related structured sections. In some examples, unstructured sections may include areas of the document in which a user can freely modify the collaborative document without any constraints. For example, a user may be able to freely type text to explain the purpose of the document. In some examples, a user may add a workflow or a structured workflow section by typing the name of (or otherwise mentioning) the workflow. In further examples, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some examples, structured sections may include text entry, selection menus, tables, checkboxes, tasks, calendar events, or any other document section. In further examples, structured sections may include text entry spaces that are a part of a workflow. For example, a user may enter text into a text entry space detailing a reason for approval, and then select a submit button that will advance the workflow to the next step of the workflow. In some examples, the user may be able to add, edit, or remove structured sections of the document that make up the workflow components.

In examples, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further examples, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In examples, the first user can select the plurality of collaborative documents and the "Group Information" section to effectuate permissions to access (or view, edit, etc.) to the entire user group the "Group Information" section of each of the plurality of collaborative documents.

Automation in the Group-Based Communication System

Figure 3A:
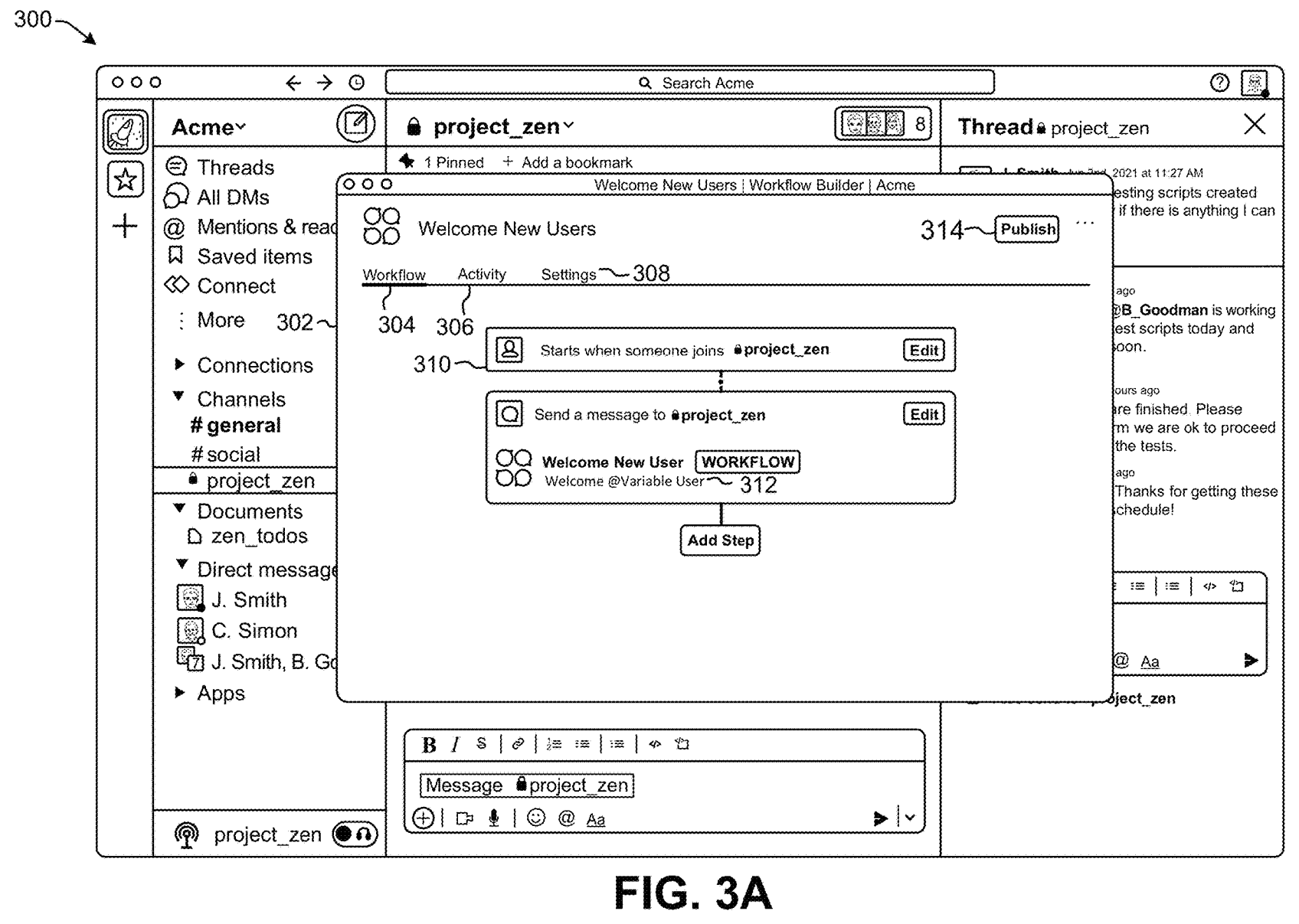

FIG. 3A illustrates user interface 300 for automation in the group-based communication system. Automation, also referred to as workflows, allow users to automate functionality within the group-based communication system. Workflow builder 302 is depicted which allows a user to create new workflows, modify existing workflows, and review the workflow activity. Workflow builder 302 may comprise a workflow tab 304, an activity tab 306, and/or a settings tab 308. In some examples, workflow builder may include a publish button 314 which permits a user to publish a new or modified workflow.

The workflow tab 304 may be selected to enable a user to create a new workflow or to modify an existing workflow. For example, a user may wish to create a workflow to automatically welcome new users who join a channel. A workflow may comprise workflow steps 310. Workflow steps 310 may comprise at least one trigger which initiates the workflow and at least one function which takes an action once the workflow is triggered. For example, a workflow may be triggered when a user joins a channel and a function of the workflow may be to post within the channel welcoming the new user. In some examples, workflows may be triggered from a user action, such as a user reacting to a message, joining a channel, or collaborating in a collaborative document, from a scheduled date and time, or from a web request from a third-party application or service. In further examples, workflow functionality may include sending messages or forms to users, channels, or any other virtual space, modifying collaborative documents, or interfacing with applications. Workflow functionality may include workflow variables 312. For example, a welcome message may include a user's name via a variable to allow for a customized message. Users may edit existing workflow steps or add new workflow steps depending on the desired workflow functionality. Once a workflow is complete, a user may publish the workflow using publish button 314. A published workflow will wait until it is triggered, at which point the functions will be executed.

Activity tab 306 may display information related to a workflow's activity. In some examples, the activity tab 306 may show how many times a workflow has been executed. In further examples, the activity tab 306 may include information related to each workflow execution including the status, last activity date, time of execution, user who initiated the workflow, and other relevant information. The activity tab 306 may permit a user to sort and filter the workflow activity to find useful information.

A settings tab 308 may permit a user to modify the settings of a workflow. In some examples, a user may change a title or an icon associated with the workflow. Users may also manage the collaborators associated with a workflow. For example, a user may add additional users to a workflow as collaborators such that the additional users can modify the workflow. In some examples, settings tab 308 may also permit a user to delete a workflow.

Figure 3B:
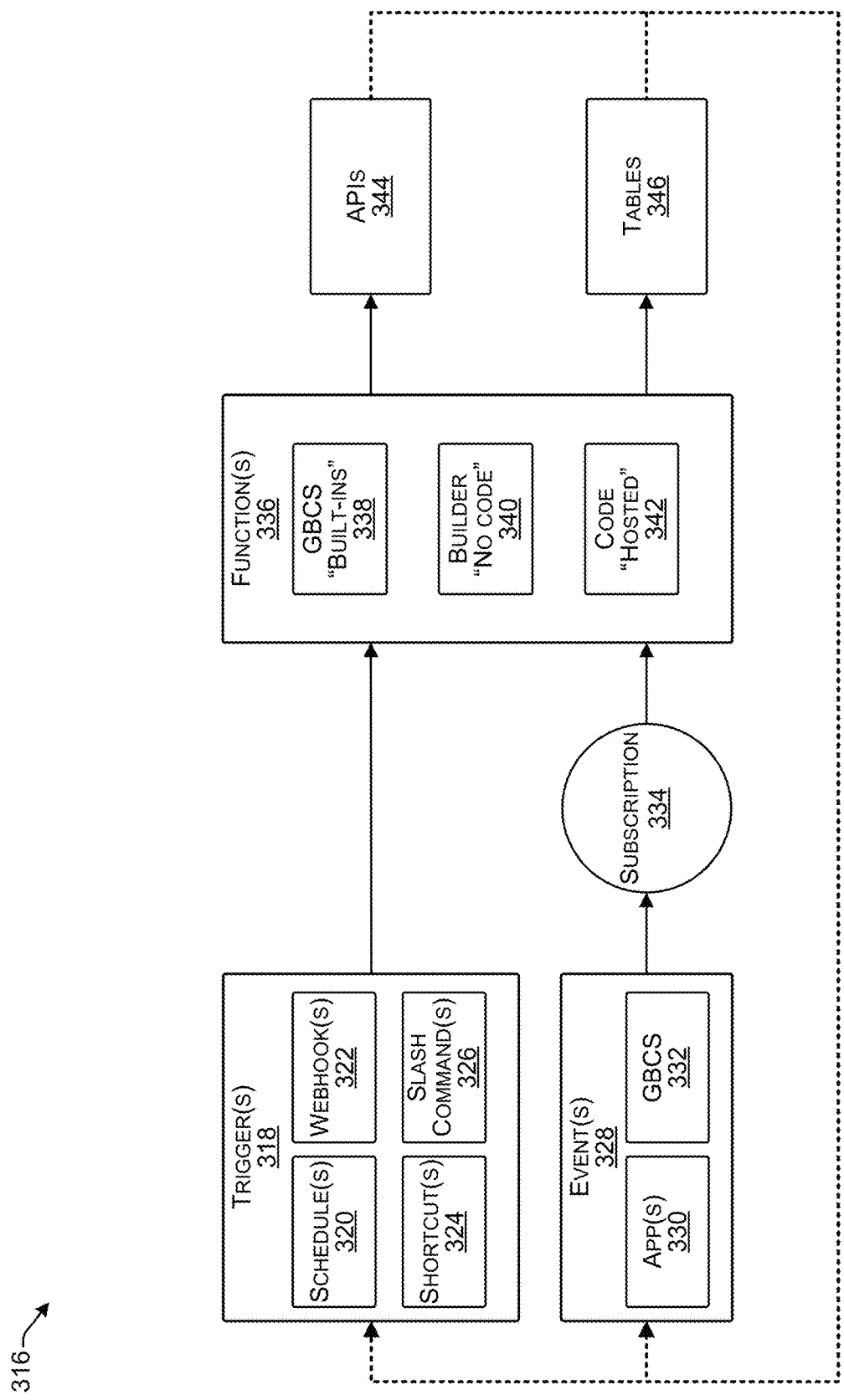
FIG. 3B depicts a block diagram for carrying out certain examples, as discussed herein.

FIG. 3B depicts elements related to workflows in the group-based communication system and is referred to generally by reference numeral 316. In various examples, trigger(s) 318 can be configured to invoke execution of function(s) 336 responsive to user instructions. A trigger initiates function execution and may take the form of one or more schedule(s) 320, webhook(s) 322, shortcut(s) 324, and/or slash command(s) 326. In some examples, the schedule 320 operates like a timer so that a trigger may be scheduled to fire periodically or once at a predetermined point in the future. In some examples, an end user of an event-based application sets an arbitrary schedule for the firing of a trigger, such as once-an-hour or every day at 9:15 AM.

Additionally, triggers 318 may take the form of the webhook 322. The webhook 322 may be a software component that listens at a webhook URL and port. In some examples, a trigger fires when an appropriate HTTP request is received at the webhook URL and port. In some examples, the webhook 322 requires proper authentication such as by way of a bearer token. In other examples, triggering will be dependent on payload content.

Another source of one of the trigger(s) 318 is a shortcut in the shortcut(s) 324. In some examples, the shortcut(s) 324 may be global to a group-based communication system and are not specific to a group-based communication system channel or workspace. Global shortcuts may trigger functions that are able to execute without the context of a particular group-based communication system message or group-based communication channel. By contrast, message- or channel-based shortcuts are specific to a group-based communication system message or channel and operate in the context of the group-based communication system message or group-based communication channel.

A further source of one of triggers 318 may be provided by way of slash commands 326. In some examples, the slash command(s) 326 may serve as entry points for group-based communication system functions, integrations with external services, or group-based communication system message responses. In some examples, the slash commands 326 may be entered by a user of a group-based communication system to trigger execution of application functionality. Slash commands may be followed by slash-command-line parameters that may be passed along to any group-based communication system function that is invoked in connection with the triggering of a group-based communication system function such as one of functions 336.

An additional way in which a function is invoked is when an event (such as one of events 328) matches one or more conditions as predetermined in a subscription (such as subscription 334). Events 328 may be subscribed to by any number of subscriptions 334, and each subscription may specify different conditions and trigger a different function. In some examples, events are implemented as group-based communication system messages that are received in one or more group-based communication system channels. For example, all events may be posted as non-user visible messages in an associated channel, which is monitored by subscriptions 334. App events 330 may be group-based communication system messages with associated metadata that are created by an application in a group-based communication system channel. Events 328 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may be able to post messages and upload files as well as be invited or removed from both public and private channels in a group-based communication system.

Events 328 may also be any event associated with a group-based communication system. Such group-based communication system events 332 include events relating to the creation, modification, or deletion of a user account in a group-based communication system or events relating to messages in a group-based communication system channel, such as creating a message, editing or deleting a message, or reacting to a message. Events 328 may also relate to creation, modification, or deletion of a group-based communication system channel or the membership of a channel. Events 328 may also relate to user profile modification or group creation, member maintenance, or group deletion.

As described above, subscription 334 indicates one or more conditions that, when matched by events, trigger a function. In some examples, a set of event subscriptions is maintained in connection with a group-based communication system such that when an event occurs, information regarding the event is matched against a set of subscriptions to determine which (if any) of functions 336 should be invoked. In some examples, the events to which a particular application may subscribe are governed by an authorization framework. In some instances, the event types matched against subscriptions are governed by OAuth permission scopes that may be maintained by an administrator of a particular group-based communication system.

In some examples, functions 336 can be triggered by triggers 318 and events 328 to which the function is subscribed. Functions 336 take zero or more inputs, perform processing (potentially including accessing external resources), and return zero or more results. Functions 336 may be implemented in various forms. First, there are group-based communication system built-ins 338, which are associated with the core functionality of a particular group-based communication system. Some examples include creating a group-based communication system user or channel. Second are no-code builder functions 340 that may be developed by a user of a group-based communication system user in connection with an automation user interface such as workflow builder user interface. Third, there are hosted-code functions 342 that are implemented by way of group-based communication system applications developed as software code in connection with a software development environment.

These various types of functions 336 may in turn integrate with APIs 344. In some examples, APIs 344 are associated with third-party services that functions 336 employ to provide a custom integration between a particular third-party service and a group-based communication system. Examples of third-party service integrations include video conferencing, sales, marketing, customer service, project management, and engineering application integration. In such an example, one of the triggers 318 would be a slash command 326 that is used to trigger a hosted-code function 342, which makes an API call to a third-party video conferencing provider by way of one of the APIs 344. As shown in FIG. 3B, the APIs 344 may themselves also become a source of any number of triggers 318 or events 328. Continuing the above example, successful completion of a video conference would trigger one of the functions 336 that sends a message initiating a further API call to the third-party video conference provider to download and archive a recording of the video conference and store it in a group-based communication system channel.

In addition to integrating with APIs 344, functions 336 may persist and access data in tables 346. In some examples, tables 346 are implemented in connection with a database environment associated with a serverless execution environment in which a particular event-based application is executing. In some instances, tables 346 may be provided in connection with a relational database environment. In other examples, tables 346 are provided in connection with a database mechanism that does not employ relational database techniques. As shown in FIG. 3B, in some examples, reading or writing certain data to one or more of tables 346, or data in table matching predefined conditions, is itself a source of some number of triggers 318 or events 328. For example, if tables 346 are used to maintain ticketing data in an incident-management system, then a count of open tickets exceeding a predetermined threshold may trigger a message being posted in an incident-management channel in the group-based communication system.

Figure 4:
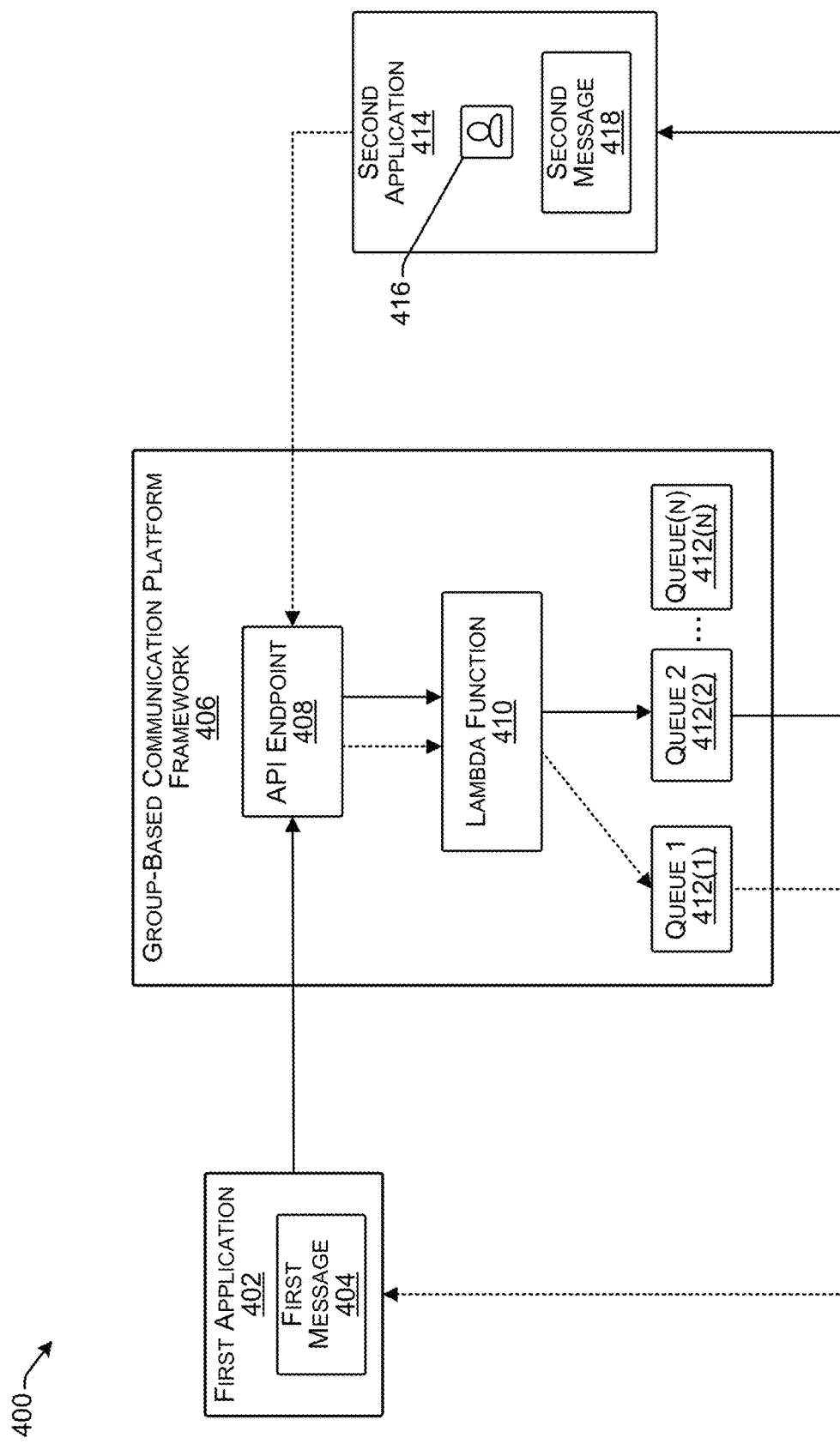
FIG. 4 illustrates another example system for performing the techniques described herein.

FIG. 4 illustrates another example system 400 for performing techniques described herein. For example, as described above, a group-based communication platform may enable applications to scale events to be distributable to various users over the group-based communication platform. For example, a framework, such as group-based communication platform framework 406, may bridge source systems and applications associated with the group-based platform such that data may be sent bi-directionally via the applications.

For example, a first application, such as first application 402, may request to send data, such as a first message 404, to a second application, such as second application 414. Thus, a group-based communication platform, such as group-based communication platform 406, may receive, at one or more computing devices, a message from the first application 402. The first application may be a third-party application and/or service, an internal application and/or service, and/or an external application and/or service. Similarly, the second application may be a third-party application and/or service, an internal application and/or service, and/or an external application and/or service. In some examples, the first application and/or the second application may be associated with the group-based communication platform, such that users of the first application and/or second application may have access to the group-based communication platform. Additionally, or alternatively, the first application and/or the second application may be associated with one or more organizations. For example, the first application 402 may be associated with a first organization, while the second application 414 may be associated with a second organization different from the first organization.

In some examples, the first message 404 may be associated with an activity stream. An activity stream may be, for example, an open format activity protocol associated with a message. This may include, for example, an approval activity (e.g., indicating an approval is required and/or has been completed), a case activity (e.g., indicating a case has been created, updated, and/or completed), a task activity (e.g., indicating a task is to be completed by a user and/or has been completed), and/or a slide activity (e.g., indicating a slide deck is ready for download), to name a few non-limiting examples. In some examples, the group-based communication platform may pre-determine an activity stream type in which messages are received, as described in more detail, below.

In some examples, the group-based communication platform may receive the first message 404, such as at an API Endpoint 408. Based at least in part on receiving the first message 404, a lambda function 410 of the group-based communication platform may determine that the activity stream associated with the first message 404 is a same or similar activity stream as the activity stream associated with the group-based communication platform. For example, the group-based communication platform may pre-determine a format of messages that the group-based communication platform framework 406 may receive. Message formats may include, for example, information such as a creation date or a current status. Upon receiving the activity stream, the lambda function 410 group-based communication platform may analyze the first message 404 to determine a message format associated with the message. The lambda function 410 may then compare the message format of first message 404 to the predetermined message format to determine that the activity stream type associated with the first message 404 is the same or a similar type of activity stream as the predetermined activity stream type. Based at least in part on determining, by the lambda function 410 of the group-based communication platform, that the activity stream type associated with the first message 404 is the same or similar as the predetermined activity stream type, the group-based communication platform framework 406 may further process the first message 404, described in detail below. In some examples, the first application 402 may contain a message adapter which may convert an activity stream format associated with a message to be the same or similar as a pre-determined activity stream format prior to being sent to the group-based communication platform, thereby ensuring messages may be sent in a correct activity type.

Alternatively, the group-based communication platform may determine that the activity stream type associated with the first message 404 is not the same or similar as the predetermined activity stream type. For example, a predetermined activity stream type may be in IMB Connection, while the first message may be in Puump.io. Thus, the group-based communication platform may send the first message 404 back to the first application 402. Thus, by ensuring messages are received in a particular activity type, the group-based communication platform may prohibit users associated with the first application from accessing, and even tampering with, other messages associated with the group-based communication platform.

Based at least in part on determining that the activity stream associated with the first message 404 is the same or similar activity stream as that associated with the group-based communication platform, the group-based communication platform may determine a topic associated with the first message 404 and/or an event of a user associated with the first message 404. A topic may be a type of an identifier associated with a message, such as a category in which the message is associated with. Alternatively, an event, as described above with regard to FIGS. 3A and 3B, may include any event associated with a group-based communication system. Such group-based communication system events may include events relating to messages in a group-based communication system channel, such as creating a message, editing or deleting a message, responding to a message, or reacting to a message, to name a few non-limiting examples. Additionally, or alternatively, an event may be associated with an application, such as the first application 402. Such application-based events may include events relating to activities in an application-based environment, such as a request for an approval or a notification of a task, for example.

In one implementation, to determine a topic and/or an event associated with the message, the message contents may be parsed (e.g., using PUP commands) to determine topics discussed in the message. For example, hashtags in the message may indicate topics associated with the message. In another example, the message may be analyzed (e.g., by itself, with other messages in a conversation primitive) or parsed using a machine-learning technique, such as topic modeling, to determine topics associated with the message.

In some examples, message user interfaces, such as attachments, may be included within the message. If there are attachments, files may be associated with the message. In one implementation, the message may be parsed (e.g., using PUP commands) to determine file names of the attachments. For example, file contents may be analyzed to determine context for the message (e.g., a patent policy document or file may indicate that the message is associated with the topic "patents").

In some examples, metadata, such as third-party metadata, may be associated with the message. For example, third party metadata may provide additional context regarding the message or the user that is specific to a company, group, channel, and/or the like. In one implementation, the message may be parsed (e.g., using PUP commands) to determine third party metadata. For example, third party metadata may indicate whether the user who sent the message is an authorized representative of the channel (e.g., an authorized representative may be authorized by the company to respond to questions in the channel).

In some examples, and although not illustrated, the group-based communication platform framework may include one or more notification services, such as Amazon Simple Notification Service (AWS SNS), which may aggregate multiple messages received from the first application 402 into a single topic. For example, multiple messages may be sent to the group-based communication platform framework, which may determine multiple topics associated with the messages. The notification service(s) may detect that the multiple topics are similar such that the multiple topics may be aggregated into a single topic. For example, the group-based communication platform may initially determine topics for three messages include "locaiton1_approval_activity," "locaiton2_approval_activity" and "locaiton3_approval_activity." As standalone messages, these messages may include three different topics. However, the simple notification service may then instead determine that the three messages are all associated with the topic "approval_activity," and may aggregate the three messages into a single "approval_activity" queue. Queues are described below.

Based at least in part on determining an event associated with the message, the group-based communication platform may send the first message 404 to a queue associated with the topic, such as queue 1 412(1). Although the current illustration illustrates the first message 404 as being sent to a single queue (queue 2), a message may be sent to any number of queues. Moreover, queues are not limited to a number of queue. Indeed, the group-based communication platform may contain any number of queues, as illustrated by queue(n) as shown in FIG. 4. In some examples, the queue is associated with the second application 414.

According to aspects of this disclosure, a user may create and/or subscribe to one or more queues, wherein each queue is associated with a topic. Each queue may be associated with a single user, thus ensuring that messages received at the group-based communication platform from the first application are sent to the correct location and user. For example, the group-based communication platform may receive, from a source application, such as the first application 404, a request to subscribe to a topic associated with the group-based communication platform. Based at least in part on approving the request, the group-based communication platform may then associate the first application with the group-based communication platform.

Similarly, a user may request to be associated with a topic via the group-based communication platform. For example the group-based communication platform may receive, via an application associated with the group-based communication platform, such as the second application 414, a request to subscribe to a topic. Based at least in part on approving the request, the group-based communication platform may then associate the topic with the user.

In some examples, based at least in part on sending the first message 404 to a queue, such as a second queue 412(2), the group-based communication platform may cause presentation of the first message 404 to a user associated with the second application, such as user 416. The message may be presented via a channel associated with the topic, sent to an inbox of the user, or presented as a pop-up notification, to name a few non-limiting examples. In some examples, the message may be presented via a bot, which may be controlled pragmatically to perform various functions. For example, the bot may present an indication of the first message 404 and one or more options associated with responding to the first message 404, such that the user 416 may respond to the request to perform the action by a selection of the one or more options presented by the bot.

In some examples, the message may include a request to perform an action. For example, the action may be associated with the source application, such as, for example, approving a request, denying a request, or generating a request for more information. Thus, the group-based communication platform may receive, from the user via the second application, a request to perform the action. Based at least in part on receiving the request to perform the action, the group-based communication platform may automatically cause performance of the action.

Similar to that described above with regard to sending the message 404 to from the first application 402 to the second application 414 via the group-based communication platform framework 406, the group-based communication platform framework 406 may facilitate the exchange of a message from the second application 414 to the first application 402 (indicated in FIG. 4 by a dotted line). For example, it may be desirable, based at least in part on causing performance of the action, to send a second message to the first application 402. For example, the first message 404 may be a request for the user 416 to approve an expense. Based at least in part on receiving the first message 404 at the second application, the user 416 may approve the request. However, an indication of the approval may need to be sent back to the first application 402 such that the first application 402 may update according to the response of the user 416. Thus, a second message may be an indication of the approval.

For example, and similar to that described above, the group-based communication platform may receive, at the API Endpoint 408, the second message. Based at least in part on receiving the second message, the lambda function 410 of the group-based communication platform may then determine that the activity stream associated with the second message 418 is a same or similar activity stream as the activity stream associated with the group-based communication platform. Based at least in part on determining, by the lambda function 410 of the group-based communication platform, that the activity stream type associated with the second message 418 is the same or similar as the predetermined activity stream type, the group-based communication platform framework 406 may further process the second message 418, described in detail below. In some examples, the similar to that of the first application 404, the second application 414 may contain a message adapter which may convert an activity stream format associated with a message to be the same or similar as a pre-determined activity stream format prior to being sent to the group-based communication platform, thereby ensuring messages may be sent in a correct activity type. Alternatively, the group-based communication platform may determine that the activity stream type associated with the second message 418 is not the same or similar as the predetermined activity stream type. For example, upon receiving the activity stream, the lambda function 410 of the group-based communication platform may analyze the second message 418 to determine a message format associated with the second message 418. The lambda function 410 may then compare the message format of second message 418 to the predetermined message format to determine that the activity stream type associated with the second message 418 is the same or a similar type of activity stream as the predetermined activity stream type. Thus, the group-based communication platform may send the second message 418 back to the second application 414.

Based at least in part on determining that the activity stream associated with second message 418 is the same or similar activity stream as that associated with the group-based communication platform, the group-based communication platform may determine a topic associated with the second message 418 and/or an event of the first application 402 associated with second message 418, similar to that described above.

Based at least in part on determining the second event, the group-based communication platform may send the second message 418 to a second queue, as shown in the current illustration as queue 1 412(1). In some cases, a user associated with the first application 402 may create and/or subscribe to one or more queues, wherein each queue is associated with a topic. Similarly, a user associated with the first application 402 may request to be associated with a topic via the group-based communication platform. For example the group-based communication platform may receive, via an application associated with the group-based communication platform, such as the second application, a request to subscribe to a topic. Based at least in part on approving the request, the group-based communication platform may then associate the topic with the first application 402. Based at least in part on sending the second message 418 to a queue, such as a first queue 412(1), the group-based communication platform may send the second message 418 to the first application 402.

In some cases, the group-based communication platform may fail to send the second message 418 to the first application 402, or the first application 402 may otherwise fail to receive the second message 418. For example, the first application 402 may experience an outage or unexpected downtime that temporarily prevents message 418 from being sent to first application 402. According to aspects of this disclosure, based at least in part on sending the second message 418 to the second queue associated with the first application 402, the group-based communication platform may receive, from the first application 402, an indication of a failure to receive the second message 418. Based at least in part on receiving the indication, the group-based communication platform may then send, to the user 416 and via the first application 402, a notification of the failure to receive the second message. In some examples, the notification of the failure to receive the second message may include a request to manually enter the second application on the first application 402, thus ensuring that the second message is properly received by the first application 402. Additionally or alternatively, in some examples, the group-based communication may wait a period of time (e.g., 30 seconds, 1 minute, 5 minutes, etc.) for an acknowledgement that the first application 402 received the second message 418. Upon determining the period of time has passed without an acknowledgement the first application 402 has received the second message 418, the group-based communication may determine the first application 402 has failed to receive the second message 418.

Figure 5:
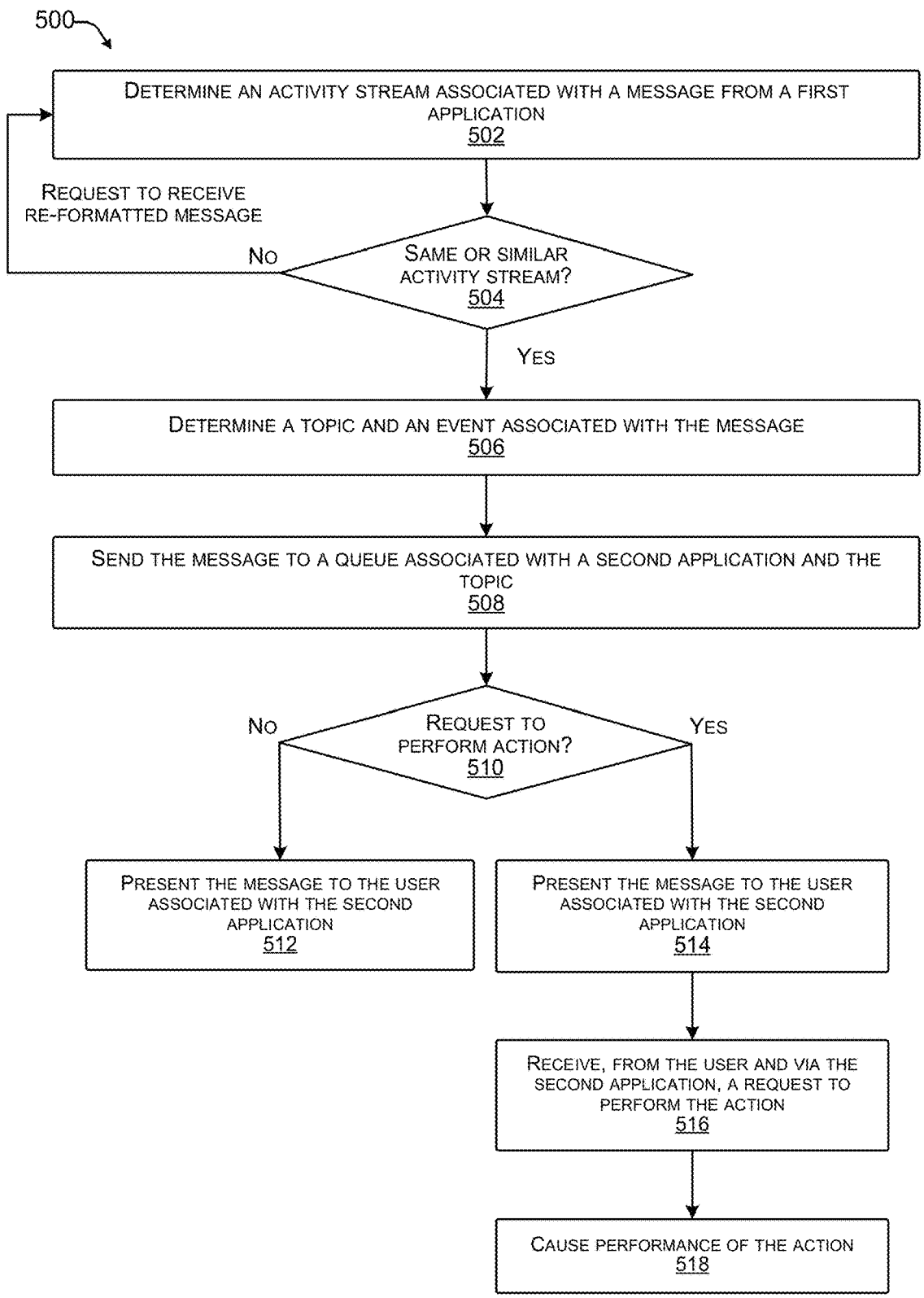
FIG. 5 illustrates a flow diagram of an example process for enabling applications to scale events to be distributed via a group-based communication platform.

FIG. 5 illustrates a flow diagram of an example process 500 for a framework associated with a group-based communication platform for enabling applications to scale events to be distributed to various users over a communication platform.

For example, at operation 502, the process may include determining an activity stream associated with a message from a first application. For example, the first application may request to send data, such as a message, to a second application. Thus, a group-based communication platform may receive, at one or more computing devices, a message from the first application. The first application and/or the second application may be a third-party application and/or service, an internal application and/or service, and/or an external application and/or service. Additionally or alternatively, the first application and/or the second application may be associated with the group-based communication platform, such that users of the first application and/or second application may have access to the group-based communication platform. In some examples, the message may be associated with an activity stream. An activity stream may be, for example, an open format activity protocol associated with a message. In some examples, the group-based communication platform may pre-determine an activity stream type in which messages are received.

Based at least in part on receiving the message from the first application, a lambda function of the group-based communication platform may analyze the message to determine a message format associated with the message. The lambda function may then compare the message format of message to a predetermined message format to determine that the activity stream type associated with the message is the same or a similar type of activity stream as the predetermined activity stream type.

At operation 504, based on determining that the activity stream associated with the message is not the same or similar to the predetermined activity stream type associated with the group-based communication platform (e.g., "no" at operation 504), the process 500 may include sending, by the group-based communication platform, the message back to the first application. By ensuring messages are received in a particular activity type, the group-based communication platform may prohibit users associated with the first application from accessing, and even tampering with, other messages associated with the group-based communication platform.

Alternatively, at operation 506 based on determining that the activity stream associated with the message is the same or similar activity stream as that associated with the group-based communication platform (e.g., "Yes" at operation 504), process 500 may include determining, by the group-based communication platform, a topic associated with the message and/or an event of a user associated with the message. A topic may be a type of an identifier associated with a message, such as a category in which the message is associated with. Alternatively, an event, as described above with regard to FIGS. 3A, 3B, and 4, may include any event associated with a group-based communication system. Such group-based communication system events may include events relating to messages in a group-based communication system channel, such as creating a message, editing or deleting a message, responding to a message, or reacting to a message, to name a few non-limiting examples. Additionally, or alternatively, an event may be associated with an application, such as first application. Such application-based events may include events relating to activities in an application-based environment, such as a request for an approval or a notification of a task, for example.

At operation 508, the process 500 may include sending the message to a queue associated with the topic and/or the second application. In some implementations, a user and/or application may create and/or subscribe to one or more queues, wherein each queue is associated with a topic. For example, each queue may be associated with a single user, thus ensuring that messages received at the group-based communication platform from the first application are sent to the correct location and user. For example, the group-based communication platform may receive, from a source application, a request to subscribe to a topic associated with the group-based communication platform. Based at least in part on approving the request, the group-based communication platform may then associate the first application with the group-based communication platform.

Similarly, a user may request to be associated with a topic via the group-based communication platform. For example the group-based communication platform may receive, via an application associated with the group-based communication platform, such as the second application, a request to subscribe to a topic. Based at least in part on approving the request, the group-based communication platform may then associate the topic with the user.

Based at least in part on sending the message to the queue associated with the topic and prior to sending the message to the second application, the group-based communication platform may determine whether the message contains a request, to the user, to perform an action. An action may include, for example, an approval or a task. For example, the group-based communication platform may analyze, such as by using machine-learning techniques, the message to determine language associated with a request to perform an action. Thus, at operation 512, based on determining that the message does not contain a request to perform an action (e.g., "No" at operation 510), the process 500 may include presenting the message to the user associated with the second application. The message may be presented via a channel associated with the topic, sent to an inbox of the user, or presented as a pop-up notification, to name a few non-limiting examples. In some examples, the message may be presented via a bot, which may be controlled programmatically to perform various functions.

Alternatively, at operation 514, based on determining that the message does contain a request to perform an action (e.g., "Yes" at operation 510), the process 500 may include presenting the message to the user associated with the second application. In some examples, the message may include one or more options associated with the action.

At operation 516, the process 500 may include receiving, from the user and via the second application, a request to perform the action in association with the group-based communication platform. For example, the message may include a request to approve or deny an expense. Thus, the message may contain an option associated with approving the expense, and an option denying the expense. The options may require the user to manually enter a response (e.g., type a response to "approve" or "disapprove." Additionally, or alternatively, the message may contain one or more selectable controls associated with actions.

At operation 516, based at least in part on receiving the request to perform the action, the process 500 may include causing, performance of the action. In this way, not only may messages be transmitted from a first application to a second application, but actions associated with such messages may be performed via the second application.

As described above with reference to FIGS. 1-5, techniques described herein are directed to a framework associated with a group-based communication platform for enabling applications to scale events to be distributed to various users over a communication platform. The framework may bridge source systems, such as third-party applications and/or applications associated with the group-based communication platform, such that data may be sent bidirectionally to and from the applications in a similar format, allowing applications to scale data transmission from one-to-one transmissions to one-to-many transmissions. Therefore, these techniques may reduce the hardware, software, and/or knowhow required for computing systems of different applications to accomplish data interchange. The techniques may also reduce an amount of data residing on cloud systems. Rather than storing messages on the cloud for later processing and authentication, messages are only received from source systems when needed. Thus, the techniques may therefore reduce the amount of hardware and/or software required to accomplish data transmissions, thereby increasing the available memory and/or computational cycles available and reducing power consumption.

Example Clauses

A: A method implemented at least in part by one or more computing devices associated with a group-based communication platform, the method comprising: receiving, at the one or more computing devices, a message from a first application, wherein the message is associated with an activity stream; determining that the activity stream associated with the message is a same or similar activity stream as an activity stream associated with the group-based communication platform; determining, based at least in part on determining that the activity stream associated with the message is the same or similar activity stream associated with the group-based communication platform: a topic associated with the message; and an event of a user associated with the message; sending, based at least in part on the event, the message to a queue associated with the topic, wherein the queue is further associated with a second application; causing to present, based at least in part on sending the message to the queue, the message to the user associated with the second application; receiving, from the user and via the second application, a request to perform an action in association with the group-based communication platform; and causing performance, based at least in part on receiving the request, of the action.

B: The method of paragraph A, wherein: the first application is associated with a first organization; and the second application is associated with a second organization different from the first organization.

C: The method of paragraph A, further comprising: receiving, from the first application, a request to subscribe to the group-based communication platform; approving the request from the first application to subscribe to the group-based communication platform; and associating the first application with the group-based communication platform; wherein causing presentation of the message to the user associated with the second application is based at least in part on associating the first application with the group-based communication platform.

D: The method of paragraph A, wherein the wherein the message is a first message, the topic is a first topic, the event is a first event, and the queue is a first queue, the operations further comprising: receiving, at the one or more computing devices, a second message from the second application; identifying a second topic associated with the second message; determining that a second event is associated with the second message; sending, based at least in part on the second event, the second message to a second queue associated with the first application, wherein the second queue is associated with the second topic; receiving, from the first application, an indication of a failure to receive the second message; and sending, to the user via the first application, a notification of the failure to receive the second message, wherein the notification includes a request to manually enter the second message on the first application.

E: The method of paragraph A, further comprising detecting the event based at least in part on a condition that is satisfied by a parameter that matches at least one of data or metadata associated with the message.

F: A system comprising: one or more processors; and one or more non-transitory computer-readable media comprising instructions that, when executed by the one or more processors, cause the system to perform operations comprising: receiving, at the one or more computing devices, a message from a first application; identifying a topic associated with the message; determining that an event is associated with the message; sending, based at least in part on the event, the message to a queue associated with a second application, wherein the queue is associated with the topic and a user of the second application; and causing presentation, based at least in part on sending the event to the queue, of the message to the user of the second application.

G: The system of paragraph F, the operations further comprising: receiving, from the user and via the second application, a request to perform an action in association with the group-based communication platform; and causing performance, based at least in part on receiving the request, of the action.

H: The system of paragraph G, wherein the message is a first message, the topic is a first topic, the event is a first event, and the queue is a first queue, the operations further comprising: receiving, at the one or more computing devices, a second message from the second application; identifying a second topic associated with the second message; determining that a second event is associated with the second message; and sending, based at least in part on the second event, the second message to a second queue associated with the first application, wherein the second queue is associated with the second topic.

I: The system of paragraph H, the operations further comprising: receiving, from the first application, an indication of a failure to receive the second message; and sending, to the user via the first application, a notification of the failure to receive the second message, wherein the notification includes a request to manually enter the second message on the first application.

J: The system of paragraph F, the operations further comprising: determining an activity stream associated with the message; and determining that the activity stream associated with the message is a same or similar activity stream as an activity stream associated with the group-based communication platform; wherein identifying the topic associated with the message is based at least in part on determining that the activity stream associated with the message is a same or similar activity stream as an activity stream associated with the group-based communication platform.

K: The system of paragraph J, wherein the activity stream represents an open format activity protocol associated with the message, and wherein the activity stream is pre-determined by the group-based communication platform.

L: The system of paragraph F, wherein: the first application is associated with a first organization; and the second application is associated with a second organization different from the first organization.

M: The system of paragraph F, the operations further comprising: receiving, from the first application, a request to subscribe to the group-based communication platform; approving the request from the first application to subscribe to the group-based communication platform; and associating the first application with the group-based communication platform; wherein causing presentation of the message to the user associated with the second application is based at least in part on associating the first application with the group-based communication platform.

N: The system of paragraph F, wherein the message includes a request for the user to submit an approval on the first application.

O: The system of paragraph F, further comprising detecting the event based at least in part on a condition that is satisfied by a parameter that matches at least one of data or metadata associated with the message.

P: One or more computer-readable media comprising instructions that, when executed by one or more processors, cause the one or more processors to perform operations comprising: receiving, at one or more computing devices associated with a group-based communication platform, a message from a first application; identifying a topic associated with the message; determining that an event is associated with the message; sending, based at least in part on the event, the message to a queue associated with a second application, wherein the queue is associated with the topic and a user of the second application; and causing presentation, based at least in part on sending the event to the queue, of the message to the user of the second application.

Q: The one or more computer-readable media of paragraph P, the operations further comprising: receiving, from the user and via the second application, a request to perform an action in association with the group-based communication platform; and causing performance, based at least in part on receiving the request, of the action.

R: The one or more computer-readable media of paragraph P, wherein the message is a first message, the topic is a first topic, the event is a first event, and the queue is a first queue, the method further comprising: receiving, at the one or more computing devices, a second message from the second application; identifying a second topic associated with the second message; determining that a second event is associated with the second message; and sending, based at least in part on the second event, the second message to a second queue associated with the first application, wherein the second queue is associated with the second topic.

S: The one or more computer-readable media of paragraph R, the operations further comprising: receiving, from the first application, an indication of a failure to receive the second message; and sending, to the user via the first application, a notification of the failure to receive the second message, wherein the notification includes a request to manually enter the second message on the first application.

T: The one or more computer-readable media of paragraph P, the operations further comprising: determining an activity stream associated with the message; and determining that the activity stream associated with the message is a same or similar activity stream as an activity stream associated with the group-based communication platform; wherein identifying the topic associated with the message is based at least in part on determining that the activity stream associated with the message is a same or similar activity stream as an activity stream associated with the group-based communication platform.

While the example clauses described above are described with respect to one particular implementation, it should be understood that, in the context of this document, the content of the example clauses can also be implemented via a method, device, system, a computer-readable medium, and/ or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented at least in part by one or more computing devices associated with a group-based communication platform, the method comprising:
   receiving, at the one or more computing devices, a message from a first application associated with a first queue, wherein the message is configured by the first application to be associated with a message format;
   identifying, based at least in part on receiving the message from the first application, the message format associated with the message, wherein the message format comprises at least one of an organization or information indicating an activity stream associated with the message;
   determining, based at least in part on comparing the message format to a predetermined message format associated with the group-based communication platform, that the activity stream associated with the message is a same or similar activity stream as an activity stream associated with the group-based communication platform;
   determining, based at least in part on determining that the activity stream associated with the message is the same or similar activity stream associated with the group-based communication platform:
      a topic associated with the message; and
      an event of a user associated with the message;
   sending, based at least in part on the event, the message to a second queue associated with the topic, wherein the second queue is further associated with a second application different from the first application;
   causing to present, based at least in part on sending the message to the second queue, the message to the user associated with the second application;
   receiving, from the user and via the second application, a request to perform an action in association with the group-based communication platform; and
   causing performance, based at least in part on receiving the request, of the action.

2. The method of claim 1, wherein:
   the first application is associated with a first organization; and
   the second application is associated with a second organization different from the first organization.

3. The method of claim 1, further comprising:
   receiving, from the first application, a request to subscribe to the group-based communication platform;
   approving the request from the first application to subscribe to the group-based communication platform; and
   associating the first application with the group-based communication platform;
   wherein causing presentation of the message to the user associated with the second application is based at least in part on associating the first application with the group-based communication platform.

4. The method of claim 1, wherein the message is a first message, the topic is a first topic, and the event is a first event, the method further comprising:
   receiving, at the one or more computing devices, a second message from the second application;
   identifying a second topic associated with the second message;
   determining that a second event is associated with the second message;
   sending, based at least in part on the second event, the second message to a third queue associated with the first application, wherein the third queue is associated with the second topic;
   receiving, from the first application, an indication of a failure to receive the second message; and
   sending, to the user via the first application, a notification of the failure to receive the second message, wherein the notification includes a request to manually enter the second message on the first application.

5. The method of claim 1, further comprising detecting the event based at least in part on a condition that is satisfied by a parameter that matches at least one of data or metadata associated with the message.

6. The method of claim 1, wherein:
   responsive to comparing the message format to the predetermined message format, the method comprises at least one of:
      confirming that the message format is a desired format and determining that the activity stream associated with the message is the same or similar activity stream; or
      determining that the message format is not a desired format and returning the message to the first application.

7. A system comprising:
   one or more processors; and
   one or more non-transitory computer-readable media comprising instructions that, when executed by the one or more processors, cause the system to perform operations comprising:
      receiving, at one or more computing devices, a message from a first application associated with a first queue;
      determining, based at least in part on receiving the message from the first application, a message format associated with the message, wherein the message format comprises an indication of a configuration of the message by the first application;
      comparing, as a comparison, the message format to a predetermined message format;
      identifying, based at least in part on the comparison, a topic associated with the message;
      determining, based at least in part on the message format, that an event is associated with the message;
      sending, based at least in part on the event, the message to a second queue associated with a second application, wherein the second queue is associated with the topic and a user of the second application; and
      causing presentation, based at least in part on sending the event to the second queue, of the message to the user of the second application.

8. The system of claim 7, the operations further comprising:
   receiving, from the user and via the second application, a request to perform an action in association with a group-based communication platform; and
   causing performance, based at least in part on receiving the request, of the action.

9. The system of claim 8, wherein the message is a first message, the topic is a first topic, and the event is a first event, the operations further comprising:
   receiving, at the one or more computing devices, a second message from the second application;
   identifying a second topic associated with the second message;

determining that a second event is associated with the second message; and sending, based at least in part on the second event, the second message to a third queue associated with the first application, wherein the third queue is associated with the second topic.

10. The system of claim 9, the operations further comprising:

receiving, from the first application, an indication of a failure to receive the second message; and sending, to the user via the first application, a notification of the failure to receive the second message, wherein the notification includes a request to manually enter the second message on the first application.

11. The system of claim 7, the operations further comprising:

determining an activity stream associated with the message based at least in part on the message format; and determining, based at least in part on the comparison, that the activity stream associated with the message is a same or similar activity stream as an activity stream associated with a group-based communication platform;

wherein identifying the topic associated with the message is based at least in part on determining that the activity stream associated with the message is a same or similar activity stream as an activity stream associated with the group-based communication platform.

12. The system of claim 11, wherein the activity stream represents an open format activity protocol associated with the message, and wherein the activity stream is pre-determined by the group-based communication platform.

13. The system of claim 7, wherein:

the first application is associated with a first organization; and the second application is associated with a second organization different from the first organization.

14. The system of claim 7, the operations further comprising:

receiving, from the first application, a request to subscribe to a group-based communication platform;

approving the request from the first application to subscribe to the group-based communication platform; and associating the first application with the group-based communication platform;

wherein causing presentation of the message to the user associated with the second application is based at least in part on associating the first application with the group-based communication platform.

15. The system of claim 7, wherein the message includes a request for the user to submit an approval on the first application.

16. The system of claim 7, further comprising detecting the event based at least in part on a condition that is satisfied by a parameter that matches at least one of data or metadata associated with the message.

17. One or more non-transitory computer-readable media comprising instructions that, when executed by one or more processors, cause the one or more processors to perform operations comprising:

receiving, at one or more computing devices associated with a group-based communication platform, a message from a first application associated with a first queue, wherein the message is configured by the first application to be associated with an activity stream;

determining, based at least in part on receiving the message from the first application, a message format associated with the message, wherein the message format comprises at least one of an organization or information indicating the activity stream associated with the message;

comparing, as a comparison, the message format to a predetermined message format;

identifying, based at least in part on the comparison, a topic associated with the message;

determining, based at least in part on the message format, that an event is associated with the message;

sending, based at least in part on the event, the message to a second queue associated with a second application different from the first application, wherein the second queue is associated with the topic and a user of the second application;

causing presentation, based at least in part on sending the event to the second queue, of the message to the user of the second application;

receiving, from the user and via the second application, a request to perform an action in association with the group-based communication platform; and causing performance, based at least in part on receiving the request, of the action.

18. The one or more non-transitory computer-readable media of claim 17, wherein the message is a first message, the topic is a first topic, and the event is a first event, the operations further comprising:

receiving, at the one or more computing devices, a second message from the second application;

identifying a second topic associated with the second message;

determining that a second event is associated with the second message; and sending, based at least in part on the second event, the second message to a third queue associated with the first application, wherein the third queue is associated with the second topic.

19. The one or more non-transitory computer-readable media of claim 18, the operations further comprising:

receiving, from the first application, an indication of a failure to receive the second message; and sending, to the user via the first application, a notification of the failure to receive the second message, wherein the notification includes a request to manually enter the second message on the first application.

20. The one or more non-transitory computer-readable media of claim 17, the operations further comprising:

determining the activity stream associated with the message; and determining that the activity stream associated with the message is a same or similar activity stream as a predetermined activity stream associated with the group-based communication platform;

wherein identifying the topic associated with the message is based at least in part on determining that the activity stream associated with the message is a same or similar activity stream as the predetermined activity stream associated with the group-based communication platform.

* * * * *